United States Patent
Considine et al.

(10) Patent No.: US 7,916,808 B2
(45) Date of Patent: Mar. 29, 2011

(54) 8PSK MODULATOR

(75) Inventors: Peter Considine, Peymeinade (FR);
Nathalie Messina, Nice (FR);
Jean-Christophe Jiguet, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1131 days.

(21) Appl. No.: 11/615,646

(22) Filed: Dec. 22, 2006

(65) Prior Publication Data

US 2007/0160166 A1 Jul. 12, 2007

Related U.S. Application Data

(60) Provisional application No. 60/867,700, filed on Nov. 29, 2006.

(30) Foreign Application Priority Data

Dec. 23, 2005 (EP) .................................. 05292791

(51) Int. Cl.
*H04L 27/12* (2006.01)

(52) U.S. Cl. ........................................................ 375/302
(58) Field of Classification Search .................. 375/302, 375/308; 332/103
See application file for complete search history.

(56) References Cited

U.S. PATENT DOCUMENTS

| | | | | |
|---|---|---|---|---|
| 4,833,479 A * | 5/1989 | Carlson | ......................... | 342/194 |
| 5,285,479 A * | 2/1994 | Iwane | ........................ | 375/298 |
| 5,425,055 A * | 6/1995 | Blaker | ......................... | 375/279 |
| 2003/0008626 A1* | 1/2003 | Miyano et al. | ................. | 455/114 |
| 2005/0025256 A1* | 2/2005 | Van De Beek et al. | ........ | 375/308 |
| 2009/0227210 A1* | 9/2009 | Mak et al. | .................. | 455/67.16 |

* cited by examiner

*Primary Examiner* — Don N Vo
(74) *Attorney, Agent, or Firm* — Ronald O. Neerings; Wade James Brady, III; Frederick J. Telecky, Jr.

(57) ABSTRACT

A modulation circuit uses pre-calculated and stored data to generate the modulated output. The modulator architecture uses pre-calculated, Gaussian filtered sine and cosine responses that are stored in a ROM (read-only memory) or other memory structure. The modulator output is then calculated as a simple sum of values read from the ROM and controlled by the input burst data stream.

14 Claims, 12 Drawing Sheets

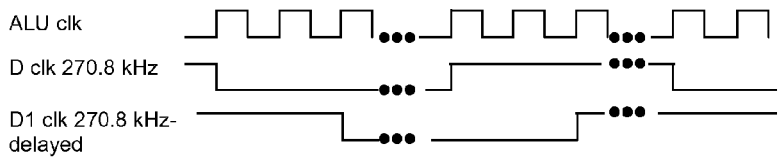

*Fig. 8*

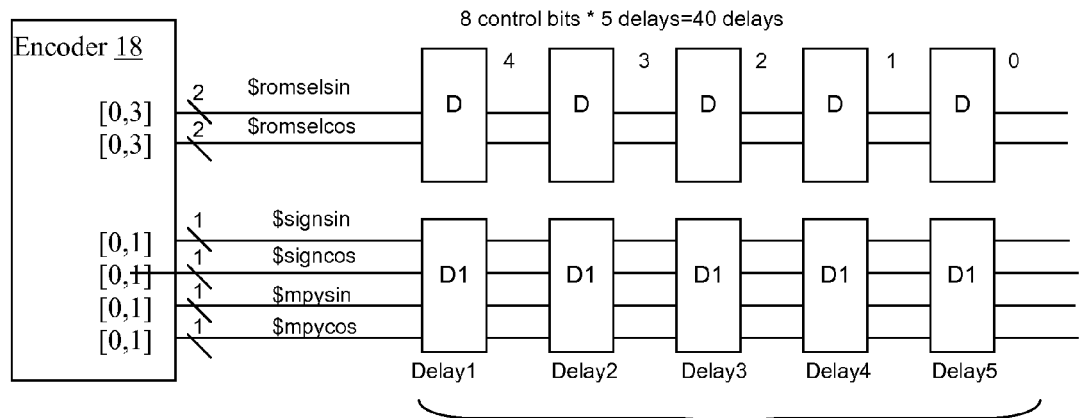

*Fig. 9*

```
node $Z  dc (int) 0 // Zero
node $U  dc (int) 1 // One

#* NEW romsel decoder making use of mode even/odd symmetry
#* romselsin,romselcos are now 1-bit each not 2-bits each
#* Equivalent enum state     0 1 2 3 4 5 6 7 8 9 10 11 12 13 14 15
#* node $romselsin mux $din 0 0 0 1 1 1 0 0 0 0 0 1 1 1 0 0
#* node $romselcos mux $din 1 1 0 0 0 0 0 1 1 1 0 0 0 0 0 1
#* node $signsin            0 0 0 0 0 0 0 0 1 1 1 1 1 1 1 1
#* node $mpysin             0 1 1 1 1 1 1 1 0 1 1 1 1 1 1 1
#* node $signcos            0 0 0 0 1 1 1 1 1 1 1 1 0 0 0 0
* node $mpycos             1 1 1 1 0 1 1 1 1 1 1 1 0 1 1 1 node $romselsin mux $din $Z $Z $Z $U $U $U $Z $Z $Z $Z $Z $U $U $U $Z $Z
node $romselcos mux $din $U $U $Z $Z $Z $Z $Z $U $U $U $Z $Z $Z $Z $Z $U
node $signsin   mux $din $Z $Z $Z $Z $Z $Z $Z $Z $U $U $U $U $U $U $U $U
node $mpysin    mux $din $Z $U $U $U $U $U $U $U $Z $U $U $U $U $U $U $U
node $signcos   mux $din $Z $Z $Z $Z $U $U $U $U $U $U $U $U $Z $Z $Z $Z
node $mpycos    mux $din $U $U $U $U $Z $U $U $U $U $U $U $U $Z $U $U $U
```

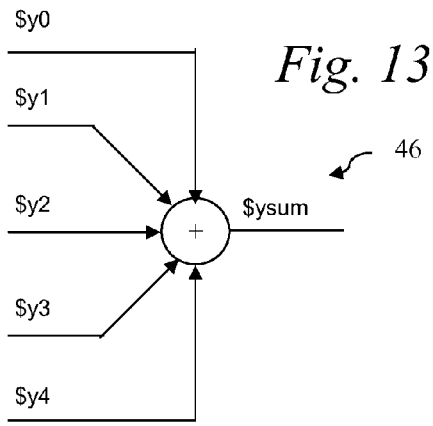
Fig. 13
Fig. 14
| ROMSEL | MODE | ROM[[1]] | ROM[[2]] | ROM[[3]] | ROM[[4]] | ROM[[5]] |
|---|---|---|---|---|---|---|
| | | GAUSSIAN SEGMENT | | | | |
| | | 1 | 2 | 3 | 4 | 5 |
| 1 | 1 | cos(Pi/8) | cos(0) | cos(Pi/8) | cos(0) | cos(Pi/8) |
| 1 | 0 | cos(0) | cos(Pi/8) | cos(0) | cos(Pi/8) | cos(0) |
| 0 | 1 | cos(3Pi/8) | cos(Pi/4) | cos(3Pi/8) | cos(Pi/4) | cos(3Pi/8) |
| 0 | 0 | cos(Pi/4) | cos(3Pi/8) | cos(Pi/4) | cos(3Pi/8) | cos(Pi/4) |
Fig. 15
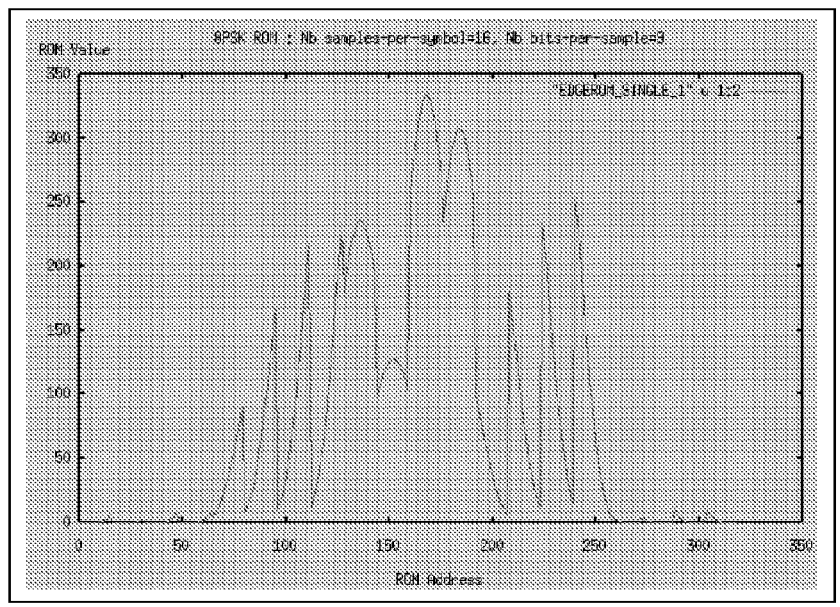

| Notation in table below: | $D_0$ means 8PSK burst-bits (B2:B1:B0) after gray-coding | | | | | | | | | | | |
|---|---|---|---|---|---|---|---|---|---|---|---|---|
| | $D_1$ means 8PSK burst-bits (B5:B4:B3) after gray-coding, etc | | | | | | | | | | | |
| | $D_i \ni [0,2,4,6,8,10,12,14] == [0, \pi/4, \pi/2, 3\pi/4, \pi, 5\pi/4, 3\pi/2, 7\pi/4]$ | | | | | | | | | | | |
| $\Sigma(Data_i + Rot_i) \ni [0,1,2,3,4,5,6,7,8,9,10,11,12,13,14,15] ==$ | | | | | | | | | | | | |
| $[0,\pi/8,\pi/4,3\pi/8,\pi/2,5\pi/8,3\pi/4,\pi,9\pi/8,5\pi/4,11\pi/8,3\pi/2,13\pi/8,7\pi/4,15\pi/8]$ | | | | | | | | | | | | |

| Signal Name | Signal Name in RTL | Time (In Symbols) < 0 | | | | Time (in Symbols) → | | | | | | |
|---|---|---|---|---|---|---|---|---|---|---|---|
| Symbol $_i$ | | $(S_{-3})$ | $(S_{-2})$ | $(S_{-1})$ | $S_0$ | $S_1$ | $S_2$ | $S_3$ | $S_4$ | $S_5$ | $S_6$ | $S_7$ |
| Data $_i$ | STATEABSDELAY[3:0] | (0) | (0) | (0) | 0 | 0 | $D_0$ | $D_1$ | $D_2$ | $D_3$ | $D_4$ | $D_5$ |
| Rot $_i$ | STATEDELAY[3:0] | (1) | (4) | (7) | 10 | 13 | 0 | 3 | 6 | 9 | 12 | 15 |
| $\Sigma(Data_i + Rot_i)$ | STATEROT[3:0] | (1)+(0) | (4)+(0) | (7)+(0) | 10+0 | 13+0 | 0+$D_0$ | 3+$D_1$ | 6+$D_2$ | 9+$D_3$ | 12+$D_4$ | 15+$D_5$ |
| Rom selection Signals (For Start of Gaussian) | romselsin(4) romselcos(4), etc | - | - | - | (7)+(0) | 10+0 | 13+0 | 0+$D_0$ | 3+$D_1$ | 6+$D_2$ | 9+$D_3$ | 12+$D_4$ |
| Rom selection Signals (For Center of Gaussian) | romselsin(2) romselcos(2), etc | - | - | - | (1)+(0) | (4)+(0) | (7)+(0) | 10+0 | 13+0 | 0+$D_0$ | 3+$D_1$ | 6+$D_2$ |

*Fig. 17*

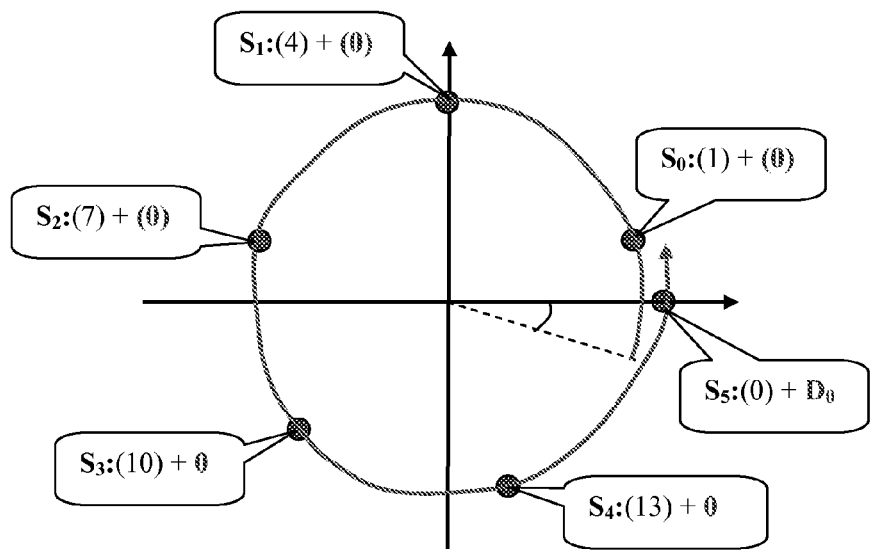

*Fig. 19*

8PSK MODULATOR

CROSS-REFERENCE TO RELATED APPLICATIONS

This application claims the benefit of the filing date of copending provisional application U.S. Ser. No. 60/867,700, filed Nov. 29, 2006, entitled "8PSK MODULATOR", which is incorporated by reference herein, and claims priority under 35 U.S.C. 119(b) to EP 05292791.0, filed Dec. 23, 2005.

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to an 8PSK modulator.

2. Description of the Related Art

Currently, there are several modulation techniques used for wireless communications. One such technique is 8PSK modulation, which uses a modulation symbol rate of $1/T_s = 1625/6$ Ksymbols/sec (approximately 270.833 Ksymbols/sec), which corresponds to 3+1625/6 Kbits/sec (i.e., 812 Kbits/sec). $T_s$ is the symbol period.

Modulation bits are Gray mapped in groups of three to 8PSK symbols by the rule: $S_i = e^{j2\pi L/8}$, where L is given by Table 1.

TABLE 1

| Gray mapping | |
|---|---|
| Modulating Bits | Parameter L |
| (1, 1, 1) | 0 |
| (0, 1, 1) | 1 |
| (0, 1, 0) | 2 |
| (0, 0, 0) | 3 |
| (0, 0, 1) | 4 |
| (1, 0, 1) | 5 |
| (1, 0, 0) | 6 |
| (1, 1, 0) | 7 |

The 8PSK Gray mapping of modulating bits of Table 1 in an IQ plane is shown in FIG. 1.

The 8PSK symbols are continuously rotated with $3\pi/8$ radians per symbol before pulse shaping. The rotated symbols are defined as $S'_i = S_i e^{ji3\pi/8}$, where i=0, 1, 2, 3 . . . . This rotation prevents origin crossing in the IQ plane.

Pulse shaping is performed as follows:

$$c_0 = \begin{cases} \prod_{i=0}^{3} S(t + iT_s), & \text{for } 0 \le t \le 5T_s \\ 0, & \text{else} \end{cases}$$

$$S(t) = \begin{cases} \sin\left(\pi \int_0^t g(t')dt'\right), & \text{for } 0 \le t \le 4T_s \\ \sin\left(\frac{\pi}{2} - \pi \int_0^{t-4T_s} g(t')dt'\right), & \text{for } 4T_s < t \le 8T_s \\ 0, & \text{else} \end{cases}$$

FIG. 2 illustrates $c_0$ and FIG. 3 illustrates S(t). The baseband signal is defined as $$y(t) = \sum_i S'_i c_0(t - iT).$$

The modulated RF (radio frequency) carrier during the useful part of the burst is defined as $$x(t') = \sqrt{\frac{2E_s}{T_s}} \text{Re}\left[y(t') \cdot e^{j(2\pi f_0 t' + \varphi_0)}\right],$$

where $E_s$ is the energy per modulating symbol, $f_0$ is the center frequency, and $\phi_0$ is a random phase, which is constant during one burst.

The calculations for 8PSK modulation can be very processor intensive. Therefore, a need has arisen for an efficiently performing 8PSK modulation.

BRIEF SUMMARY OF THE INVENTION

In the present invention, a modulator stores pre-calculated, filtered sine and cosine responses in a memory. Responsive to data, a plurality of the sine and cosine responses are read from memory. A plurality of cosine responses are added together to generate an in-phase modulated signal and a plurality of sine responses are added together to generate a quadrature signal.

The present invention uses significantly less processing power to modulate data.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 8 illustrates the encoder block of FIG. 6;
FIG. 9 illustrates the mapping of the NNUM angles into component ROMSEL, SIGN and MPY values for both the cosine and sine of the NNUM angle;
FIG. 13 illustrates the ALU of FIG. 6;

FIG. 14 illustrates and arrangement of the twenty segments of each sample;

FIG. 15 illustrates a graphical view of the content of a 3π/8PSK ROM;

FIGS. 17, 18 and 19 illustrate a method of initializing a 3π/8 8PSK modulator such that the output of the modulator has constant amplitude immediately after modulator enable, irrespective of the modulator group delay and processing delay;

DETAILED DESCRIPTION OF THE INVENTION

The present invention is best understood in relation to FIGS. 4-20 of the drawings, like numerals being used for like elements of the various drawings.

The present invention uses pre-calculated and stored data to generate the modulated output. The modulator architecture of the preferred embodiment described herein differs from previous implementations in that it uses pre-calculated, Gaussian filtered sine and cosine responses that are stored in a ROM (read-only memory) or other memory structure. The modulator output is then calculated as a simple sum of values read from the ROM and controlled by the input burst data stream.

Figure 1:
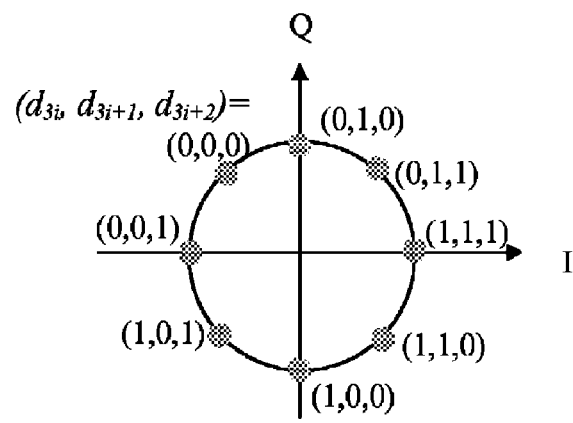
FIG. 1 illustrates an IQ mapping plane.
Figure 4:
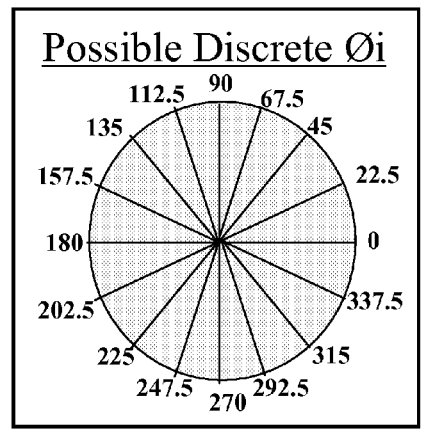
FIG. 4 illustrates a diagram of the 16 possible discrete phase angles (prior to Gaussian filtering)

Referring to FIG. 4, a diagram of the 16 possible discrete phase angles (prior to Gaussian filtering) is shown. As described above, 8PSK burst data maps to eight discrete symbols, shown in Table 1 and FIG. 1. When these symbols are combined with all possible combinations of 3π/8 rotation, there are only sixteen discrete phase angles ($S_i$), as shown in FIG. 4. Table 2 illustrates the sine and cosine values for these sixteen angles:

variables MPYSIN, MPYCOS $\in [0,1]$ are used to denote zero value (when variable=0). The signs associated with the coded amplitudes for each phase angle is given by SSign and CSign.

The baseband signal, when described by in-phase and quadrature (I,Q) components, becomes:

$$I(t) = Y\cos(t) = \sum_{i=-\infty}^{\infty} \cos(\phi_i) \cdot c_0(t+iT),$$

where $\phi_i$ is shown in FIG. 4.

$$= \sum_{i=n-3}^{n+1} \cos(\phi_i) \cdot c_0(t+iT)(\text{since } c_0(t+iT) = 0 \text{ for } n-3 < t < n+2) =$$

$$\cos\phi_{n-3} \cdot ① + \cos\phi_{n-2} \cdot ② + \cos\phi_{n-1} \cdot ③ + \cos\phi_n \cdot ④ + \cos\phi_{n+1} \cdot ⑤,$$

and $$Q(t) = \sin\phi_{n-3} \cdot ① + \sin\phi_{n-2} \cdot ② + \sin\phi_{n-1} \cdot ③ + \sin\phi_n \cdot ④ + \sin\phi_{n+1} \cdot ⑤,$$

where

Figure 5:
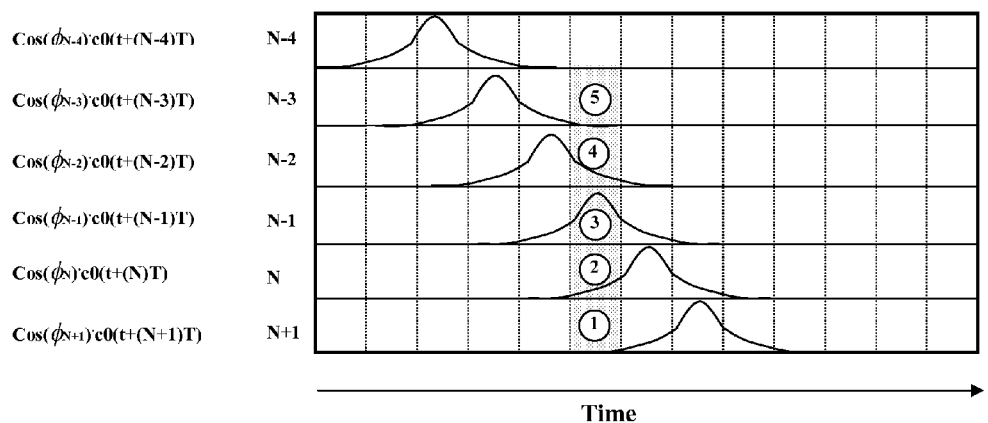
FIG. 5 illustrates Gaussian filters.

① through ⑤ are the Gaussian filters shown in FIG. 5.

Gaussian filtering is non-zero only in the range from −2.5T to 2.5T, where T is the symbol time, equal to 48/13 MHz= 3.69 μsec for EGPRS (Enhanced General Purpose Radio Services). Thus, the infinite integral simplifies to the sum of the Gaussian responses of the five most recent symbols. This is illustrated graphically for the cosine component I(t) in FIG. 5.

Accordingly, the entire modulation can be reconstructed from a set of simple selection variables (SROM, CROM, SSIGN, CSIGN, SINMPY, and COSMPY), if the Gaussian response to the four discrete non-zero amplitude delta functions is stored in a memory over the range [0:5T]. Thus, by

TABLE 2

Sine and cosine values for 16 discrete phase angles

| Angle | NNUM | Sin | SROMSEL | SSign | Cos | CROMSEL | CSign |
|---|---|---|---|---|---|---|---|
| 0 | 1 | 0 | 5 | 1 | 1 | 4 | 1 |
| 22.5 | 2 | 0.382683 | 1 | 1 | 0.92388 | 3 | 1 |
| 45 | 3 | 0.707107 | 2 | 1 | 0.707107 | 2 | 1 |
| 67.5 | 4 | 0.92388 | 3 | 1 | 0.382683 | 1 | 1 |
| 90 | 5 | 1 | 4 | 1 | 0 | 5 | 1 |
| 112.5 | 6 | 0.92388 | 3 | 1 | −0.382683 | 1 | −1 |
| 135 | 7 | 0.707107 | 2 | 1 | −0.707107 | 2 | −1 |
| 157.5 | 8 | 0.382683 | 1 | 1 | −0.92388 | 3 | −1 |
| 180 | 9 | 0 | 5 | 1 | −1 | 4 | −1 |
| 202.5 | 10 | −0.382683 | 1 | −1 | −0.92388 | 3 | −1 |
| 225 | 11 | −0.707107 | 2 | −1 | −0.707107 | 2 | −1 |
| 247.5 | 12 | −0.92388 | 3 | −1 | −0.382683 | 1 | −1 |
| 270 | 13 | −1 | 4 | −1 | 0 | 5 | 1 |
| 292.5 | 14 | −0.92388 | 3 | −1 | 0.382683 | 1 | 1 |
| 315 | 15 | −0.707107 | 2 | −1 | 0.707107 | 2 | 1 |
| 337.5 | 16 | −0.382683 | 1 | −1 | 0.92388 | 3 | 1 |

As can be seen, the sixteen discrete phase angles have only four non-zero amplitudes (without consideration of the sign). Each angle can be decomposed into a series of constants which describe their sines and cosines. First, each angle is assigned a number (NUM) from "1" to "16". A code representing the amplitude of the sine (SROM) and the cosine (CROM) is provided, where codes "1" through "5" represent the values given by cos (3π/8), cos(π/4), cos(π/8), cos(0) and cos(π/2), respectively. Alternatively, the sine and cosine could be coded with values "1" through "4", if two new storing the values $\cos(\phi) \cdot c_0(t)$, for $0 \leq t < 5T$, where $\phi \in \{3\pi/8, \pi/4, \pi/8, 0\}$, in a memory, the modulation can be performed through simple addition.

Figure 6:
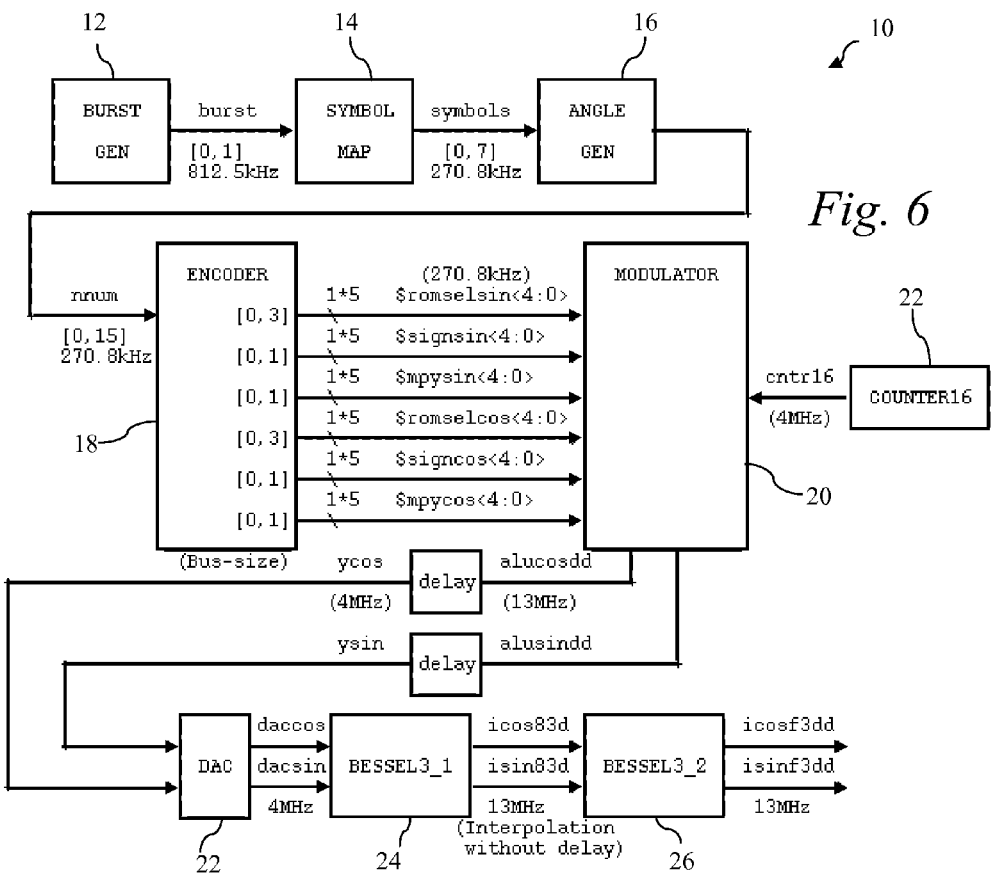
FIG. 6 illustrates a schematic for an implementation of the preferred embodiment of a modulation circuit.

FIG. 6 illustrates a schematic for an implementation of the preferred embodiment. In modulator 10, a burst generator 12, a memory buffer loaded with burst bits for a given modulation burst (468.75 bits/burst or 156.25 symbols/burst in 8PSK), outputs symbols to symbol map 14. Symbol map 14 maps the symbols according to the Gray scale of Table 1. The angle generator 16 integrates the 3π/8 rotation with the symbol stream from the symbol map and outputs the code for the discrete angle NNUM (1:15), as described in Table 2.

Encoder 18 receives NNUM and generates the ROMSEL, SIGN, MPY codes for by the sine and cosine of each NNUM according to Table 2. Encoder 18 further pushes each of the six codes into six registers running at the signal frequency (270.8 kHz), so that the Gaussian components of the five most recent symbols can be constructed by the modulator 20, as follows. The modulator reads out ten Gaussian curves from a ROM memory (not shown), five for the cosine component of the Gaussian filtered discrete angle, five for the sine component of the Gaussian filtered discrete angle, and for each multiplies by zero and corrects for sign if required. Then the five cosine components are summed together to create the In-Phase, I(t), modulated signal, and the five Sine components are summed to create the Quadrature, Q(t), modulated signal. These digital bit-streams are then converted to analog signals by dual DAC (Digital-to-Analog) converters 22, and low-pass filtered by filters 24 and 26 to attenuate out-of-band and sampling clock frequencies before mixing with the RF carrier frequency (not shown).

Figure 7:
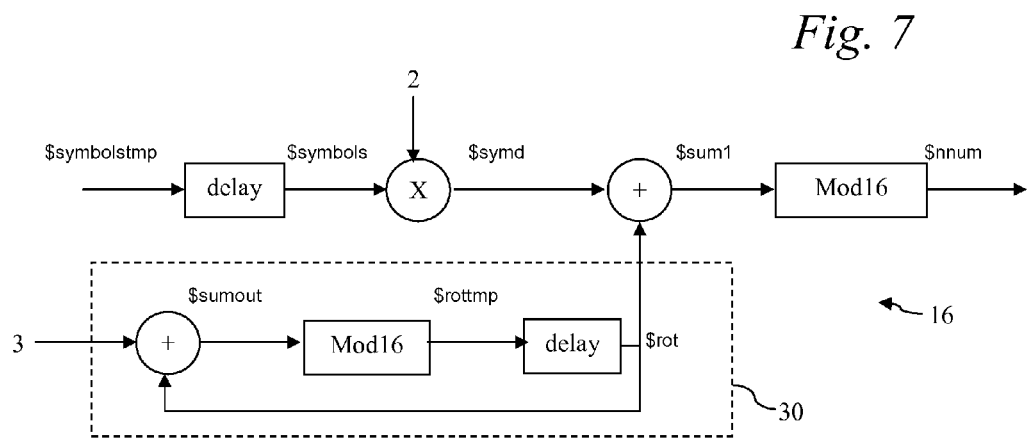
FIG. 7 is a functional diagram of the angle generator of FIG. 6.

FIG. 7 a functional diagram of the angle generator 16 in more detail. The angle generator 16 contains a 4-bit counter 30 running at the symbol frequency counting in steps of 3 (i.e., $3\pi/8$) modulo-16 which creates the continuously rotating $3\pi/8$-per-symbol rotation vector, $rot \in[0:7]$. The symbol vector $\epsilon[0:7]$ is doubled ($symd) to map to the same scale as $rot, and both $rot and $symbd are summed ($sum1) modulo-16 to create $nnum as described in Table 2.

Figure 2:
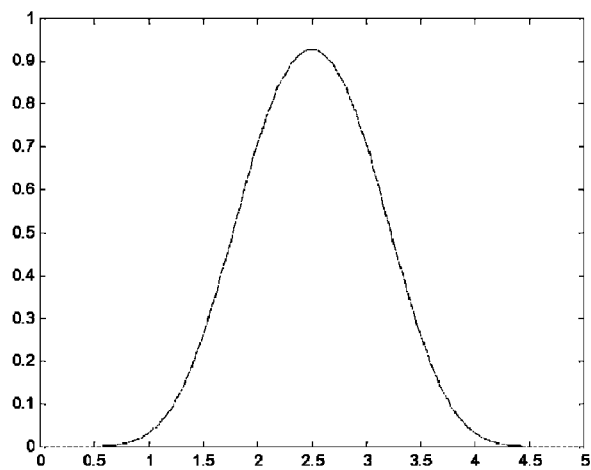
FIGS. 2 and 3 illustrate pulse shaping of symbols.
Figure 3:
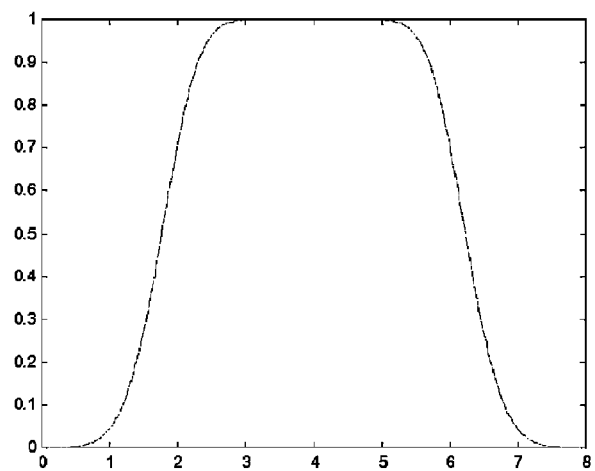

FIG. 8 illustrates the encoder block 18 with a five-deep shift register 32. The five-deep shift register on each encoder output allows the modulator to generate all five Gaussian components of both I(t) and Q(t). FIG. 9 illustrates the mapping of the NNUM angles into component ROMSEL, SIGN and MPY values for both the cosine and sine of the NNUM angle, in accordance with FIG. 2.

Figure 10:
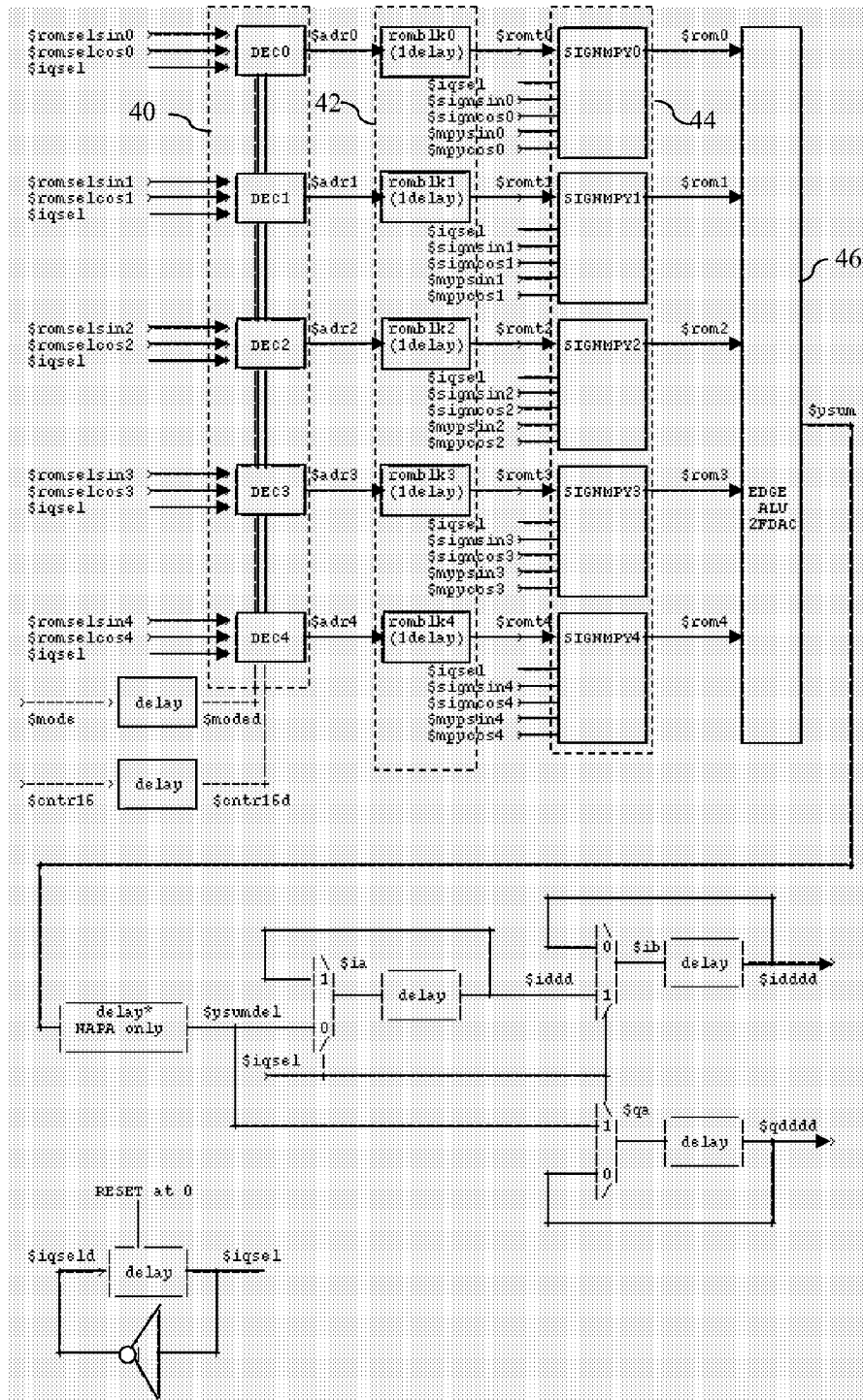
FIG. 10 illustrates the modulator of FIG. 6.

FIG. 10 illustrates the modulator 20. Modulator 20 includes a Rom decoder 40, a 5-input/5-output ROM 42, a SIGN/MPY circuit 44 and an ALU 46. This block outputs I(t) and Q(t) samples at the DAC frequency, which is K times the symbol frequency (270.8 kHz).

Since ROM access requires one clock cycle at ALU clock frequency, SIGN and MPY signals should be delayed accordingly before being combined with ROM output. In the physical implementation instead of adding a battery of flip-flops to achieve this delay, the symbol clock (D1) used for the SIGN/MPY signal shift register in the encoder of FIG. 8 is simply delayed by one ALU clock period. This allows several flip-flops to be eliminated.

Since both I(t) and Q(t) are each composed of five Gaussian components, ten independent values must be read from the ROM during one DAC cycle. These are combined in the ALU 46 to create I(t) and Q(t). ROMSEL for both Sine and Cosine changes every symbol-period. Since the DAC frequency is K times the symbol frequency, a modulo-K counter steps through the K values within the 10 selected Gaussian component segments (which are static during a given symbol period).

Figure 11:
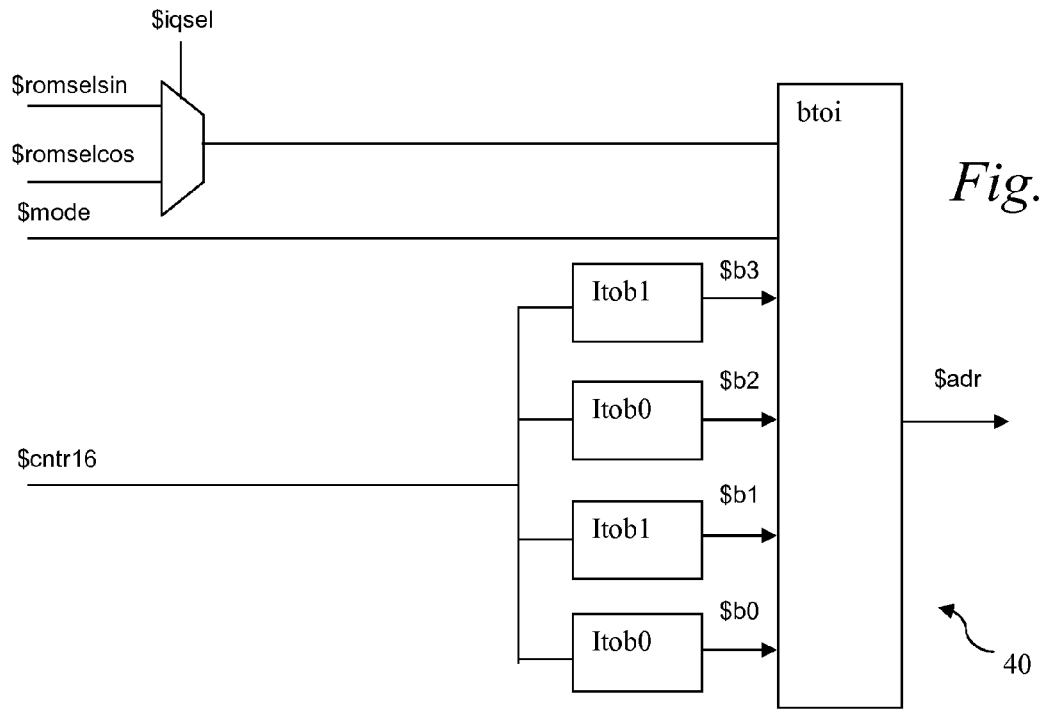
FIG. 11 illustrates the ROM decoder circuit of FIG. 6.

FIG. 11 illustrates the ROM decoder circuit 40. The ROM decoder circuit 40 is a static block (no delays). A preferred embodiment for ROM organization is described in more detail below. ROM address is composed of ROMSEL (for either Sine or Cosine), MODE signal, and a modulo-K counter. ROM access time is one ALU clock cycle.

Figure 12:
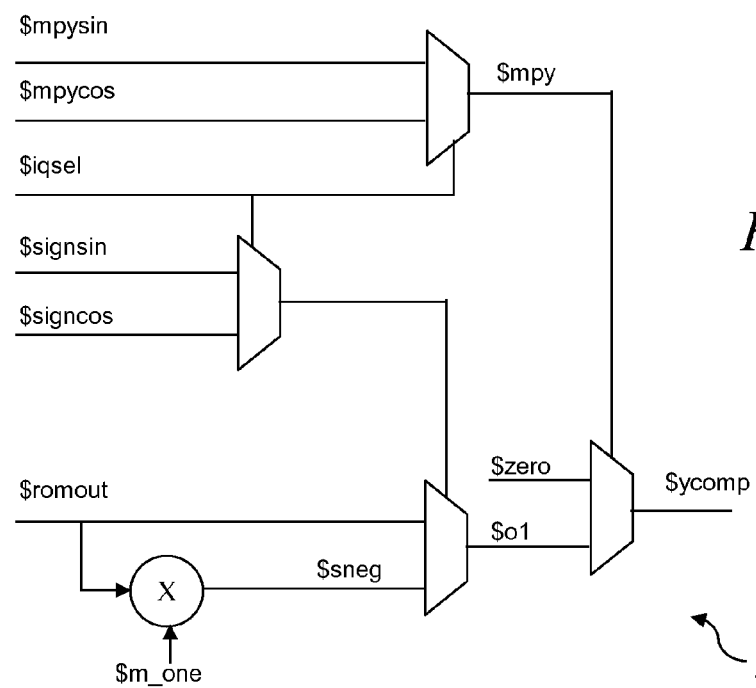
FIG. 12 illustrates the SIGN/MPY circuit of FIG. 6.

FIG. 12 illustrates the SIGN/MPY circuit 44. The SIGN/MPY circuit applies sign correction and zeroing of ROM output values before being applied to the ALU.

FIG. 13 illustrates the ALU 46. The ALU block needs to process both I(t) and Q(t) simultaneously if it runs at the DAC frequency. However if the ALU is made to run at, for example, twice the DAC frequency, then I(t) and Q(t) can be processed sequentially over two ALU cycles. This allows the ALU block to be halved in size. In FIG. 13 the ALU is a simple 5-input static adder.

As described above, the modulator 20 requires the Gaussian filtered response to the four delta functions cos $\{3\pi/8, \pi/4, 0\}$ to be stored in a ROM memory. In other words, the ROM memory must store:

$$\cos \phi * c_0(t) \text{ for } 0 \leq t < 5T,$$

where $\phi \in \{3\pi/8, \pi/4, 0\}$, $c_0(t)$ is the Gaussian function described above and T is the symbol period. Therefore, the ROM must store, in total, $5\times4=20$ segments of 1-symbol duration, as shown in FIG. 14. If the DAC frequency is K times the symbol frequency, and each sample contains a number of bits equal to NBITS, the total ROM size is $20*K*NBITS$. For K=16 and NBITS=9, the ROM would need to be at least 2880 bits.

As shown in FIG. 14, the twenty segments of each K samples can be in arranged in a way that allows very simple decoding. ROM1 contains the left side of the Gaussian, ROM3 the maximum amplitude part and ROM5 the right-hand side. As described above, $S_i \in[0:7]$ and is multiplied by 2 to the range [0:15] before adding the $3\pi/8$ rotation vector, $rot. Therefore, if $S'_i$ is an even number, then $S'_{i+1}$ is odd. It can readily be seen from Table 2 that if $S'_i \in[\pi/8, 0]$ then $S'_{i+1} \in[3\pi/8, \pi/4]$. This means that one bit of the 2-bit ROMSEL code is in fact redundant, the second bit being replaced by a clock signal at the symbol frequency called MODE. For a given ROMSEL value and MODE value, ROMS (1~5) swap consecutively between $[\pi/8$ and $0]$ when ROMSEL=1 and $[3\pi/8, \pi/4]$ when ROMSEL=0.

Therefore, if ROM1 output is Cos($\pi/4$) because ROMSEL=0 and MODE=0 then at the next symbol update, this ROMSEL=0 is shifted along in the ROMSEL shift-register, ROM2 will output the second segment of the same Cos($\pi/4$) Gaussian because the MODE signal would now be 0. In addition, since each Gaussian curve is divided into 5 segments each of K-samples, a common modulo-K counter can step through all K samples of all selected segments.

ROM codes are normalized such that the maximum 8PSK values of I(t) and Q(t) are $2^{NBITS+1}$ where the I and Q DACs are coded on NBITS+1 bits, while the ROM samples are coded on NBITS bits. This maximizes the dynamic range of the DAC and therefore the Signal-to-Noise ratio seen at the analog output (I,Q). A graphical view of the content of a $3\pi/8$PSK ROM is shown in FIG. 15.

In one embodiment of the present invention, the EGPRS architecture incorporates both an 8PSK modulator and a GMSK modulator (or a QPSK or similar modulator) on the same chip, where the GMSK modulator can be of a conventional design. Burst data for both GMSK and 8PSK modulators are transferred to the chip via a serial interface and stored in either of two RAM burst-buffers. This transfer takes place before the burst bits are modulated and Gaussian filtered. When the radio transmit path is enabled (signal BULENA=1), burst bits start to be read from the burst buffer and modulated. The bit-rate for GMSK is 270.8333 kHz, while for 8PSK it is 3 times faster, at 812.5 kHz. The symbol rate, 270.8333 kHz is the same for both modulation types. Multi-slot operation in GPRS (and EGPRS) requires continuously modulating data over several bursts (1 burst is 156.25 symbol times). This is achieved by the use of only two RAM burst buffers by loading Buffer1 while Buffer2 is being modulated (and vice-versa).

Figure 16A:
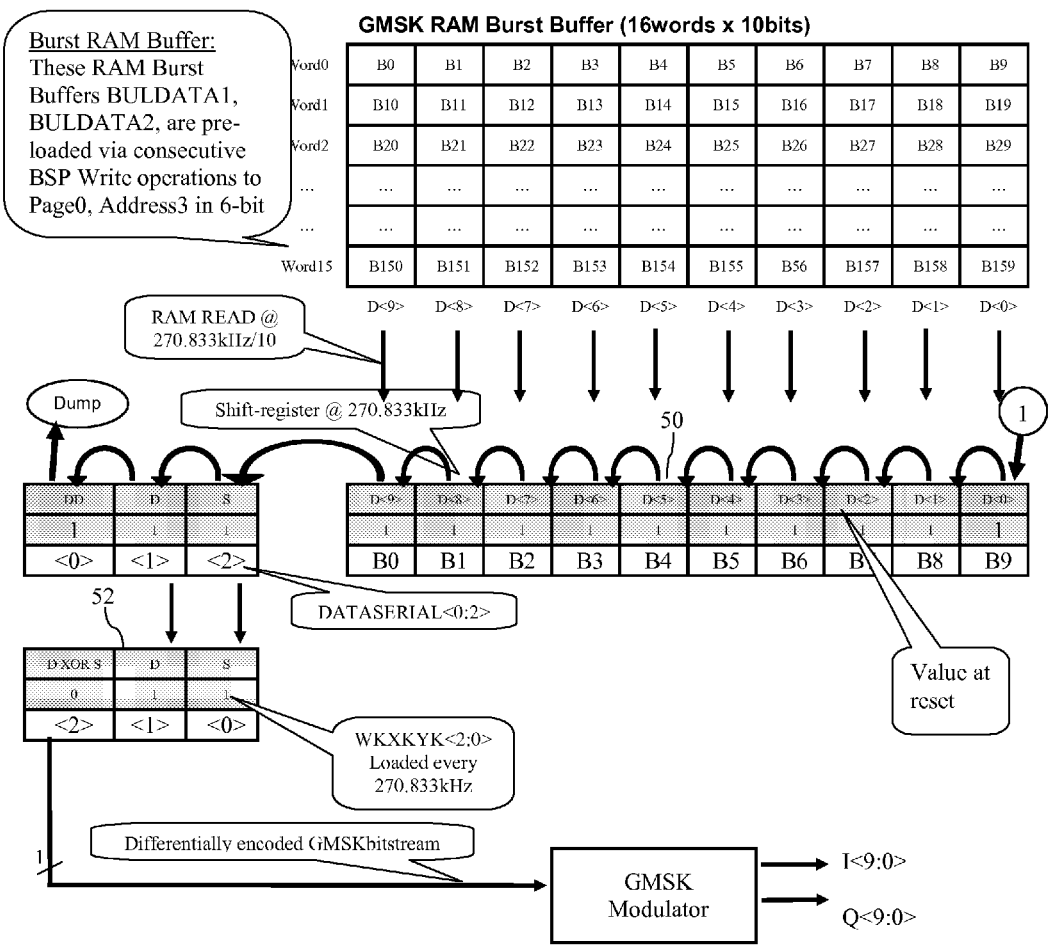
FIGS. 16a and 16b illustrate use of the modulation circuit for both GMSK and 8PSK modulation types.
Figure 16B:
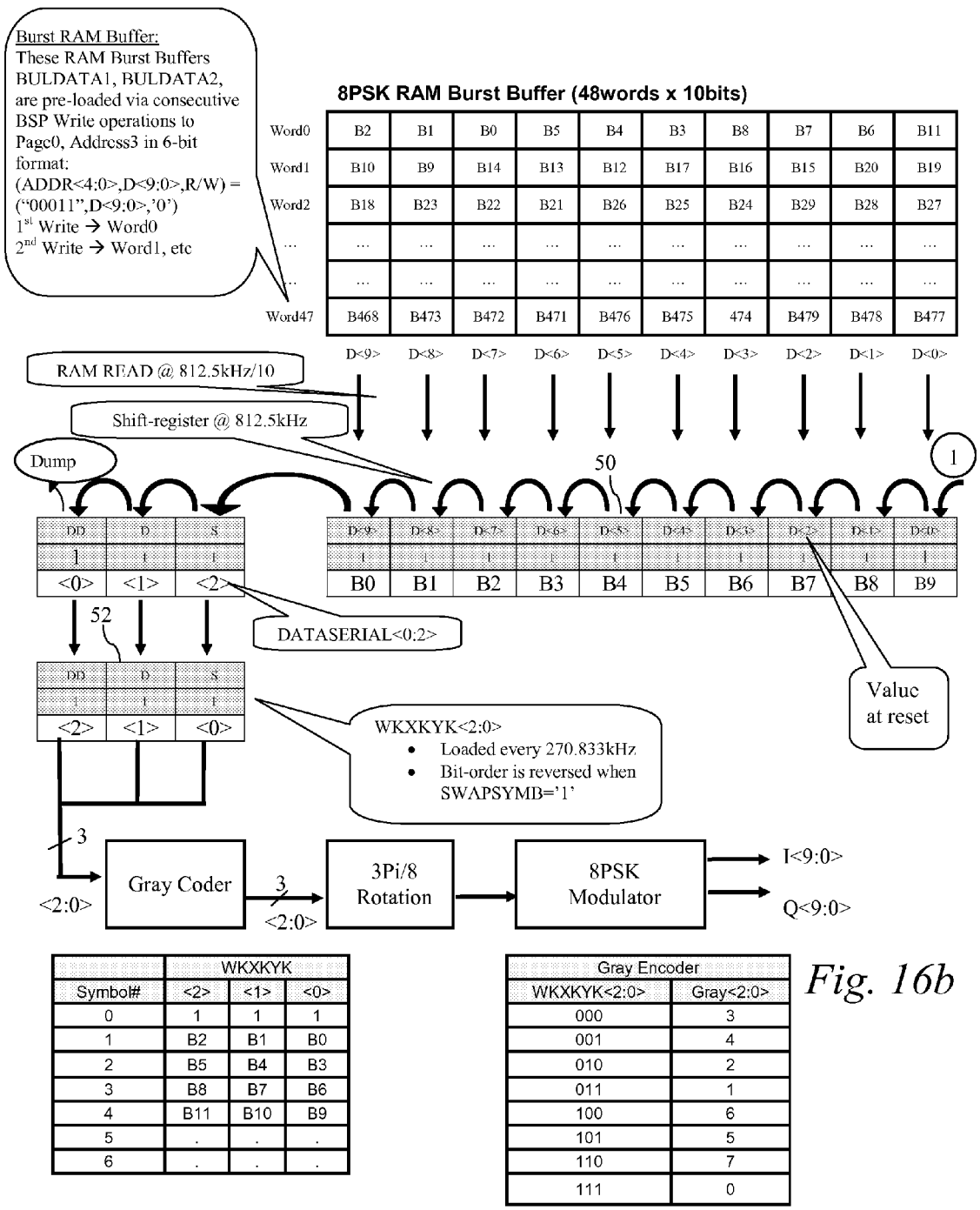

The advent of EGPRS has added the requirement of multi-modulation to the existing multi-slot scheme. FIGS. 16a-b illustrate configurations for GMSK and 8PSK modulation types, respectively, allowing two burst buffers to be shared between both modulators to allow multi-slot multi-modulation operation.

When transmit path modulation is enabled, the burst bits will be read and modulated from the selected burst-buffer RAM. FIG. 16a shows the configuration for GMSK modulation type while FIG. 16b shows how the same hardware is reconfigured for 8PSK modulation type. While this embodiment of the invention is shown with GMSK and 8PSK modulation, the invention can be used for multiplexing any pre-modulation data of any modulation type.

In FIG. 16a, when Modulation-type=GMSK, burst data words of N-bits is loaded into the N LSB's of an (N+M)-bit shift register 50 at a frequency of Fbit(Mod-Type)/N. The shift register itself shifts 1-bit to the left at frequency Fbit (Mod-Type). For GMSK the MSB is discarded and the next two MSBs are loaded into two LSB's of a separate M bit register 52 at the frequency Fsymbol(Mod-Type). The XOR of these 2 bits is presented at the input of the GMSK modulator 54.

FIG. 16b illustrates the same hardware when Modulation-type=8PSK. In this example, N=10, M=3, Fbit(8PSK)=812.5 kHz, Fsymbol=270.8 kHz. For 8PSK, the only difference (apart from loading/shifting frequencies) is that the MSB of the (N+M)-bit shift register 50 is not discarded, and M MSBs (not M−1 as in GMSK case) are loaded into the M-bit register 52 at the frequency Fsymbol(Mod-Type), and all M-bits are presented to the input of the 8PSK modulator.

Figure 18:
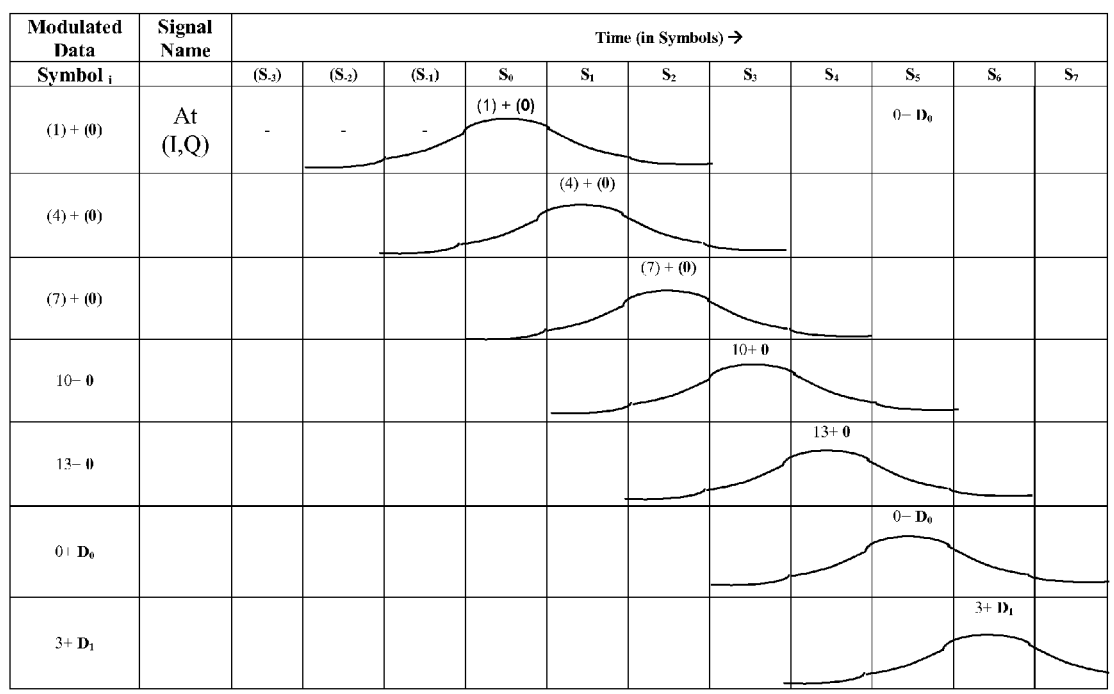

FIGS. 17 and 18 illustrate a method of initializing a 3π/8 8PSK modulator such that the output of the modulator has constant amplitude immediately after modulator enable, irrespective of the modulator group delay and processing delay.

Basically the modulator is reset in such a way that when enabled, it immediately starts modulating along the unit-circle in the (I,Q)-plane with constant amplitude ($\sqrt{I^2+Q^2}$). In order to ramp RF power to the required power-level for a given burst, commonly the modulated signal amplitude is multiplied by a time-varying ramp signal (analog or digital) to create a smooth power-ramp profile which accurately controls power-level at the PA (power amplifier) output during the ramp, and limits spurious out of band power emissions, as specified in detail in ETSI specifications. In order for the ramp signal to accurately control the power ramp, it is necessary for the modulator output amplitude to remain constant. If the modulator output is active and seen at the PA during power ramping then usually burst data 1's are modulated during the ramping phase. For continuous modulation of 1's in GMSK this produces a constant amplitude signal. In 8PSK modulating 1's, i.e., always the same symbol the modulation will follow the near constant amplitude trajectory of the 3π/8 vector rotation. The amplitude of 8PSK modulation of 1's varies ~+/−0.15 dB from its RMS value, as shown in Table 3 below:

TABLE 3

Amplitude variations for 3π/8 8PSK Modulations

| | Burst-type | | | |
|---|---|---|---|---|
| | Random V | 1's V | Random dB | 1's dB |
| Max | 1.017380 | 0.815392 | 3.267020 | 1.344670 |
| Rms | 0.698446 | 0.802926 | 0.000000 | 1.211360 |
| Min | 0.150593 | 0.789971 | −13.326500 | 1.069560 |
| Span | 0.866788 | 0.025421 | 16.593600 | 0.275104 |

Since the Gaussian filter length is five symbols, the time for a Gaussian filtered burst symbol to reach its maximum amplitude is 2.5 symbols plus any processing delay in the modulator implementation. If the reset were done at 0 for all data bits for example, it would take several symbol periods before the modulator output would have a constant amplitude, even if the modulating data were all 1's, because of the group delay of at least 2.5 symbols. This type of uncontrolled time-varying amplitude would strongly impact the power-ramp profile and must be avoided. Therefore the reset at modulator start-up needs to be constructed as if the modulator had been modulating 1's in its past history (time t<0).

A solution for this problem is set forth below. In this solution, the control signals are initialized such that the phase angle equals zero degrees during the output of the first symbol. Four key initializations are used:

1. 3LSB bits of 13-bit shift register used in burst RAM output; should be reset to all 1's.
2. Initial symbol reset to 0;
3. 3π/8 rotation reset to 10, i.e., 225 degrees; and
4. Initialize romsel, sign, multiply control signals to the equivalent of:

nnum<0:4>=(7,4,1,14,11)

where:
    nnum=modulation phase-angle (data+rotation)
    nnum<0>=nnum delayed by 1 FSYMB period
    nnum<1>=nnum delayed by 2 FSYMB periods
    nnum<2>=nnum delayed by 3 FSYMB periods
    nnum<3>=nnum delayed by 4 FSYMB periods
    nnum<4>=nnum delayed by 5 FSYMB periods
    (7,4,1,14,11) represent phase angles:
    0==0.0 degrees,
    1==22.5 degrees
    .
    .
    .
    15==360.0 degrees In the ENCODER block this is accomplished with the following:

TABLE 4

Initial values

| | Shifted signal with initial value to be set | | | | |
|---|---|---|---|---|---|
| | 4 | 3 | 2 | 1 | 0 |
| nnum | 7 | 4 | 1 | 14 | 11 |
| $romelsin | 0 | 1 | 0 | 0 | 1 |
| $romselcos | 1 | 0 | 1 | 0 | 0 |
| $ signsin | 0 | 0 | 0 | 1 | 1 |
| $ mpysin | 1 | 1 | 1 | 1 | 1 |
| $ signcos | 1 | 0 | 0 | 0 | 1 |
| $ mpycos | 1 | 0 | 2 | 1 | 1 |

This initialization scheme is illustrated on FIGS. 17, 18 and 19. When 1's are modulated $S_i=0$ (denoted $D_0=0$), and due to the processing delay of the modulator shown reaches it's maximum amplitude 5.5 symbols after the modulator is enabled. The ROMSEL and SIGN values of both Cosine and Sine are set such that $S_i=0$ for [i−3:i+2] in their respective shift registers. Similarly the rotation vector is initialized at 10 such that during the $6^{th}$ symbol it has rotated to 0. Thus when 1's are modulated, the modulator will immediately trace out the unit circle, and in addition reach (I,Q)=(1,0) after 5.5 symbols.

For a smaller group delay, the reset values can be adjusted accordingly.

Figure 20:
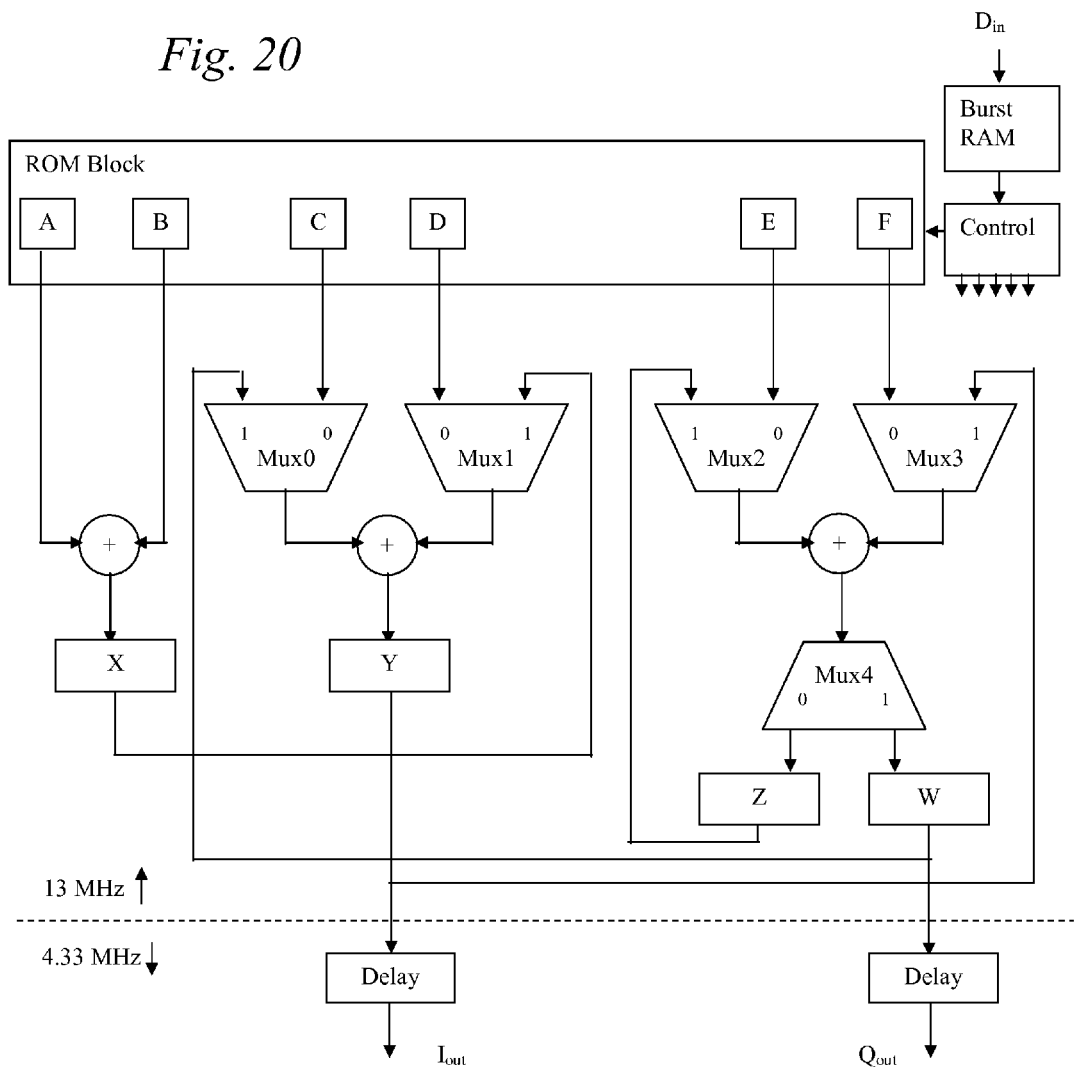
FIG. 20 illustrates an alternative embodiment for the ALU of FIG. 6.

FIG. 20 illustrates an alternative embodiment for the ALU. As described above, $$I(t) = Y\cos(t)$$
$$= \sum_{i=-\infty}^{\infty} \cos(\phi_i) \cdot c_0(t+iT)$$
$$= \cos\phi_{n-3} \cdot ① + \cos\phi_{n-2} \cdot ② + \cos\phi_{n-1} \cdot ③ + \cos\phi_n \cdot ④ + \cos\phi_{n-1} \cdot ⑤$$
$$= A + B + C + D + E$$

and $$Q(t) = Y\sin(t)$$
$$= \sin\phi_{n-3} \cdot ① + \sin\phi_{n-2} \cdot ② + \sin\phi_{n-1} \cdot ③ + \sin\phi_n \cdot ④ + \sin\phi_{n+1} \cdot ⑤$$
$$= \underline{A} + \underline{B} + \underline{C} + \underline{D} + \underline{E},$$

where ① through ⑤ are the Gaussian filters shown in FIG. 5.

Several adders are required to realize I(t) and Q(t) for 8PSK modulation. The ALU in FIG. 13 requires four adders for operation at twice the DAC frequency. The ALU shown in FIG. 20 requires only three adders, but runs at three times the DAC frequency.

In FIG. 20, the ROM block includes six outputs (A, B, C, D, E and F) to the ALU 46. Adder 1 receives outputs A and B from the ROM Block. Adder 2 receives the output of two multiplexers Mux0 and Mux1. Adder 23 receives the output of two multiplexers Mux2 and Mux3. Adder1 outputs its sum to register X, Adder2 outputs its sum to register Y and Adder3 outputs its sum to a demultiplexer (Mux4). Mux4 outputs the sum from Adder3 to either register Z or register W. Mux0 selects between the output of register W and output C from the ROM block. Mux1 selects between the output of register X and output D from the ROM block. Mux2 selects between the output of register Z and output E from the ROM block. Mux3 selects between the output of register Y and output F from the ROM block. The ROM block, multiplexers and adders are controlled by control circuit 100. Register Y stores the I output and register W stores the Q output.

The control of the adders is shown in Table 5.

TABLE 5

| Cycle | Adder1 | Adder2 | Adder3 | W | X | Y | Z |
|---|---|---|---|---|---|---|---|
| 0 | A + B→X | C + D→Y | D + E→Z | | | | |
| 1 | $\underline{A}+\underline{B}$→X | C + X = A + B + C →Y | E + Y = C + D + E →W | | A + B | C + D | D + E |
| 2 | — | W + X = $\underline{A}+\underline{B}+\underline{C}+\underline{D}+\underline{E}$→Y | Z + Y = A + B + C + C + E→W | $\underline{C}+\underline{D}+\underline{E}$ | $\underline{A}+\underline{B}$ | A + B + C | D + E |
| 0 | A + B→X | C + D→Y | D + E→Z | A + B + C + D + E | | $\underline{A}+\underline{B}+\underline{C}+\underline{D}+\underline{E}$ | |
| 1 | $\underline{A}+\underline{B}$→X | C + X = A + B + C →Y | E + Y = C + D + E →W | | A + B | C + D | D + E |
| 2 | — | W + X = $\underline{A}+\underline{B}+\underline{C}+\underline{D}+\underline{E}$→Y | Z + Y = A + B + C + D + E | $\underline{C}+\underline{D}+\underline{E}$ | $\underline{A}+\underline{B}$ | A + B + C | D + E |
| 0 | ... | ... | ... | A + B + C + D + E | | $\underline{A}+\underline{B}+\underline{C}+\underline{D}+\underline{E}$ | |

As described above, the ALU computes I(t)=A+B+C+D+E and Q(t)=$\underline{A}+\underline{B}+\underline{C}+\underline{D}+\underline{E}$ in three clock cycle. Output A of the ROM block outputs $\overline{A}$ or A as shown in the table. Likewise output B of the ROM block outputs $\overline{B}$ or B, output C of the ROM block outputs $\overline{C}$ or C, and output D of the ROM block outputs $\overline{D}$ or D. Output F outputs either $\overline{D}$ or D.

In the first clock (cycle0), adder 1 performs the addition of A+B and stores the result in register X, adder 2 performs the addition of C+D and stores the result in register Y, and adder 3 performs the addition of D+E and stores the result in register Z. In the second clock, adder1 performs the calculation of $\underline{A}+\underline{B}$ and stores the result in register X, adder2 performs the calculation of C+X (where X currently stores the result A+B) and stores the result in register Y, and adder3 performs the calculation of E+Y (where Y currently stores the result C+D) and stores the result in register W. In the third clock, adder1 is idle, adder 2 performs the calculation of W+X (where W stores the result C+D+E and X stores the result $\underline{A}+\underline{B}$) and adder3 performs the calculation of Z+Y (where Y stores the result A+B+C and Z stores the result D+E). Hence at the start of the next cycle0, register W holds the sum of A+B+C+D+E and register Y holds the sum of $\underline{A}+\underline{B}+\underline{C}+\underline{D}+\underline{E}$.

This aspect of the invention reduces the number of adders needed to calculate I(t) and Q(t).

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A modulator comprising:
   a memory storing pre-calculated, filtered sine and cosine responses;
   circuitry for reading a plurality of said sine and cosine responses from memory;
   circuitry for adding a plurality of cosine responses together to generate an in-phase modulated signal and for adding a plurality of sine responses together to generate a quadrature signal; and
   initialization control circuitry for initializing the output of the modulator at a constant amplitude immediately after reset.

2. The modulator of claim 1 and further comprising a counter running at a predetermined symbol frequency to create a rotation vector.

3. The modulator of claim 1 and further comprising a sign/multiply circuit for applying sign correction and zeroing of the sine and cosine responses from the memory.

4. The modulator of claim 1 wherein the responses are Gaussian filtered.

5. The modulator of claim 1 wherein the circuitry for reading a plurality of responses from memory includes circuitry for generating a memory select signal and a mode signal, wherein the mode signal comprises a clock signal at a predetermined signal frequency.

6. The modulator of claim 1 wherein said initialization control circuitry comprises circuitry for initializing the modulator so that upon modulating at time t=0, the modulator modulates data as if it had been modulating 1's prior to t=0.

7. The modulator of claim 1, wherein the modulator modulates using an 8PSK modulation type.

8. A modulator comprising:
a memory storing pre-calculated, filtered sine and cosine responses;
circuitry for reading a plurality of said sine and cosine responses from memory; and
circuitry for adding a plurality of cosine responses together to generate an in-phase modulated signal and for adding a plurality of sine responses together to generate a quadrature signal, the adding circuitry comprising:
first, second and third adders, each adder for adding two inputs to form an output;
the first adder receiving inputs from the memory;
the second adder selective receiving a first input from either the memory or a stored output from the first adder and a second input from either the memory or a first stored output of the third adder; and
the third adder selectively receiving a first input from either the memory or from a second stored output of the third adder and a second input from either the memory or a stored output of the second adder.

9. A method of modulating data using a modulator comprising the steps of
storing pre-calculated, filtered sine and cosine responses in a memory;
reading a plurality of said sine and cosine responses from memory;
adding a plurality of cosine responses together to generate an in-phase modulated signal and for adding a plurality of sine responses together to generate a quadrature signal; and
initializing the output of the modulator at a constant amplitude immediately after reset.

10. The method of claim 9 and further executing a counter running at a predetermined symbol frequency to create a rotation vector.

11. The method of claim 9 and further comprising applying sign correction and zeroing of the sine and cosine responses from the memory.

12. The method of claim 9 wherein the step of storing pre-calculated, filtered sine and cosine responses comprises the step of storing pre-calculated, Gaussian filtered sine and cosine responses.

13. The method of claim 9 wherein the step of reading a plurality of responses from memory includes the step of generating a memory select signal and a mode signal, wherein the mode signal comprises a clock signal at a predetermined signal frequency.

14. The method of claim 9 wherein the initializing step comprises the step of initializing the modulator so that upon modulating at time t=0, the modulator modulates data as if it had been modulating 1's prior to t=0.

* * * * *